(12) United States Patent
Cerny (10) Patent No.: US 6,193,040 B1
(45) Date of Patent: Feb. 27, 2001

(54) ELECTROMAGNETIC CLUTCH AND PULLEY ASSEMBLY

(75) Inventor: Zdenek Cerny, Brampton (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/234,502

(22) Filed: Jan. 21, 1999

Related U.S. Application Data (60) Provisional application No. 60/072,085, filed on Jan. 21, 1998, and provisional application No. 60/084,868, filed on May 8, 1998.

(51) Int. Cl.[7] .............................. F16D 27/12; F16D 3/06
(52) U.S. Cl. ...................... 192/84.961; 192/200; 192/209
(58) Field of Search .............................. 192/55.3, 84.941, 192/84.961, 200, 209; 464/89; 403/227

(56) References Cited

U.S. PATENT DOCUMENTS

| | | |
|---|---|---|
| 1,674,225 | 6/1928 | Reed . |
| 1,719,624 | 7/1929 | Reed . |
| 1,721,504 | 7/1929 | Reed . |
| 1,825,981 | 10/1931 | Reed . |
| 1,906,057 | 4/1933 | Guy . |
| 1,954,190 | 4/1934 | Zeder . |
| 2,705,058 | 3/1955 | Harter . |
| 3,044,594 | 7/1962 | Bernard . |
| 3,055,575 | 9/1962 | Pitts, Jr. . |
| 3,082,933 | 3/1963 | Bernard . |
| 3,205,989 | 9/1965 | Mantey . |
| 3,325,760 | 6/1967 | Bernard . |
| 3,384,213 | 5/1968 | Bernard et al. . |
| 3,425,529 | 2/1969 | Hayashi . |
| 3,455,421 | 7/1969 | Miller . |
| 3,565,223 | 2/1971 | Pierce . |
| 3,774,739 | 11/1973 | Higuchi . |
| 4,150,738 | 4/1979 | Sayo et al. . |
| 4,187,939 | 2/1980 | Silvestrini et al. . |
| 4,471,860 | 9/1984 | Yamada . |

(List continued on next page.)

FOREIGN PATENT DOCUMENTS

| | | | |
|---|---|---|---|
| 0 537 022 A1 | 4/1993 | (EP) | ................................ F16D/67/06 |
| 59-113325 | 6/1984 | (JP) | ................................ F16D/27/14 |
| 6-74258 | 3/1994 | (JP) | ............................... F16D/27/112 |
| 7-54867 | 2/1995 | (JP) | ............................... F16D/27/112 |

*Primary Examiner*—Rodney H. Bonck
(74) *Attorney, Agent, or Firm*—Pillsbury Madison & Sutro LLP (57) ABSTRACT

An electromagnetic clutch and pulley assembly includes a clutch assembly, a pulley assembly having a pulley member drivable for rotation about a shaft axis by a flexible belt, and an electromagnetic coil assembly disposed adjacent to the pulley member. The pulley member is coupled to a shaft when the electromagnetic coil assembly is energized. The clutch assembly includes a hub, an armature disk, torsion transmitting structure and axially compressible resilient structure. The torsion transmitting structure can transmit torsional movement of the armature disk to the hub. The axially compressible resilient structure biases the armature disk axially away from the pulley member, the axially compressible resilient structure being axially compressible to permit the armature disk to move into engagement with the pulley member and thereby enable the armature disk to be rotatably driven by the pulley member, and hence enable the armature disk to transmit rotation of the pulley member through the torsion transmitting structure to the hub and the shaft to drive the component in response to the electromagnetic coil assembly being energized. The axially compressible resilient structure is in non-torsion transmitting relation with respect to the hub and the armature disk and constitutes the sole structure that biases the armature disk axially away from the pulley member, so that the sole structure which biases the armature disk axially away from the pulley member is substantially isolated from torsional transmission between the hub and the armature disk.

18 Claims, 5 Drawing Sheets

U.S. PATENT DOCUMENTS

| | | |
|---|---|---|
| 4,493,407 | 1/1985 | Newton . |
| 4,574,930 | 3/1986 | Koitabashi . |
| 4,624,354 | 11/1986 | Koitabashi . |
| 4,749,073 | 6/1988 | Olsen . |
| 4,808,870 | 2/1989 | Gonda . |
| 4,828,090 | 5/1989 | Matsushita . |
| 4,860,867 | 8/1989 | Nishimura . |
| 4,993,532 | 2/1991 | Weiss et al. . |
| 5,009,297 | 4/1991 | Gonda . |
| 5,046,594 | 9/1991 | Kakinuma . |
| 5,184,705 | 2/1993 | Sekiguchi et al. . |
| 5,195,625 | 3/1993 | Chang et al. . |
| 5,238,094 | 8/1993 | Steele . |
| 5,252,874 | 10/1993 | Viegas . |
| 5,445,256 | 8/1995 | Tabuchi et al. . |
| 5,667,050 | 9/1997 | Hasegawa . |
| 5,683,299 | 11/1997 | Kishibuchi et al. ............. 192/209 X |
| 5,687,823 | 11/1997 | Nakagawa et al. . |
| 5,692,591 | 12/1997 | Kimura . |

ELECTROMAGNETIC CLUTCH AND PULLEY ASSEMBLY

This application claim benefit to Provisional Application 60/072,085 and filing date Jan. 21, 1998 and claim benefits to Provisional Application 60/084,868 and filing date May 8, 1998.

BACKGROUND OF THE INVENTION

The present invention relates to an electromagnetic clutch and pulley assembly which couples the driving movement of a flexible belt to an input shaft of an auxiliary component in a motor vehicle.

It is known in the field of automotive engines to provide an endless belt driven by an output shaft, which endless belt is used to transmit the torque of the output shaft to various vehicle components. Specifically, the belt is trained about a plurality of pulley assemblies that are associated with the input shafts of the components to be driven. Certain of such components may also be provided with a clutch assembly that is mounted on the component input shaft to be driven and used to engage and disengage the driven pulley. For example, the input shaft of an air conditioning compressor needs to be driven only when air conditioning within the vehicle is desired. When the air conditioning system is turned on, the clutch assembly engages the pulley to enable the system to be driven. When the air conditioning system is shut down, the clutch assembly disengages the associated pulley, and the pulley will no longer drive the compressor input shaft.

Typically, the clutch assemblies employed for such applications provide resilient structure, such as one or more leaf springs or one or more compression springs, that normally biases the armature plate of the clutch assembly in an axial direction away from the associated component pulley, so that the clutch armature plate remains spaced from the pulley.

When the clutch assembly is activated, a magnetic current in the coils provided as part of the pulley assembly attracts the clutch armature plate. The armature plate then moves against the force of the resilient structure and into engagement with the pulley to enable the pulley to drive the component. Typically, after the clutch plate is in engagement with and driven by the pulley, the resilient structure operates in the transmission of torque between the pulley and clutch armature.

In the instance that the resilient structure is in the form of a rubber-based or elastic material, such as a rubber-based compression spring, the resilient structure becomes subject to somewhat of a sheering action during torque transmission. This sheering action effectively reduces the useful life of the resilient structure. While metal based resilient structures may be more durable, they undesirably generate more noise during operation. In either case, because the resilient structure operates (and is subject to stress) in both the axial movement of the clutch armature plate and during torque transmission, it must be engineered to accommodate both functions. This makes it difficult to finely tune the resilient structure for its primary function, which is to resiliently bias the clutch armature plate away from the pulley, and to allow the armature plate to move into rapid, yet soft and quiet engagement with the pulley when the clutch assembly is energized.

A first object of the invention is to provide an electromagnetic clutch and pulley assembly that enables a relatively soft and quiet, yet fast engage/disengage function. The assembly provides a resilient spring member which operates in the axial direction for biasing the clutch to a disengage position, and which is independent of the torque transmitting function between the driving pulley and the driven armature mechanism. More specifically, the present invention provides an electromagnetic clutch and pulley assembly comprising a pulley member, an electromagnetic coil assembly, and a clutch assembly. The pulley member is mounted for rotation about the shaft axis, and the electromagnetic coil assembly is associated with the pulley member. The clutch assembly is constructed and arranged to selectively couple the pulley member to the shaft responsive to energizing and de-energizing the electromagnetic coil assembly. The clutch assembly includes a hub, and armature disk, torsion transmitting structure, and axially compressible resilient structure. The hub is constructed and arranged to be coupled to the shaft, and the armature disk is operatively associated with the hub. The armature disk is axially spaced from the pulley member. The armature disk is axially movable into engagement with the pulley member when the electromagnetic coil assembly is energized. The torsion transmitting structure is constructed and arranged to transmit torsional loads between the armature disk and the hub. The axially compressible resilient structure biases the armature disk axially away from the pulley member and is substantially isolated from the torsional loads.

It is a further object of the invention to provide a clutch assembly that addresses the problems associated with the prior art noted above.

In addition, it is a further object of the invention to overcome the above-noted problems of the prior art while also providing torsional damping. Accordingly, the present invention provides an electromagnetic clutch and pulley assembly for a motor vehicle engine comprising: a pulley assembly, an electromagnetic coil assembly, and a clutch assembly. The pulley assembly includes a pulley member drivable for rotation about the shaft axis by a flexible belt. The electromagnetic coil assembly is disposed adjacent to the pulley member. The clutch assembly couples the pulley member to the shaft when the electromagnetic coil assembly is energized. The clutch engagement assembly includes a hub, an armature disk, torsion transmitting structure, and axially compressible resilient structure. The hub is constructed and arranged to be coupled to the shaft, and the armature disk is operatively associated with the hub, the armature disk being axially spaced from the pulley member when the electromagnetic coil assembly is de-energized. The armature disk is axially movable into engagement with the pulley member when the electromagnetic coil assembly is energized. Torsion transmitting structure transmits torsional movement between the hub and the armature disk, the torsion transmitting structure including a rigid structure fixed to the armature disk and a resilient compression spring disposed between the rigid structure and the hub, the resilient compression spring reducing peak torsional load and dampen torsional vibration between the hub and armature disk. The axially compressible resilient structure biases the armature disk axially away from the pulley member, the axially compressible resilient structure being constructed and arranged to be axially compressible to permit the armature disk to move into engagement with the pulley member and thereby enable the armature disk to be rotatably driven by the pulley member, and hence enable the armature disk to transmit rotation of the pulley member through torsion transmitting structure to the hub and the shaft to drive the component in response to the electromagnetic coil assembly being energized. The axially compressible resilient structure is in non-torsion transmitting relation with respect to the hub and the armature disk and constituting the sole structure that biases the armature disk axially away from the pulley member, so that the sole structure which biases the armature disk axially away from the pulley member is substantially isolated from torsional transmission between the hub and the armature disk.

Another object of the invention is to provide an electromagnetic clutch assembly which is radially compact and which reduces the number of components. In accordance with the present invention, the clutch assembly has its axial and torsional coupling components all disposed within a radius defined by the innermost magnetic field dividing portion of the armature. In one embodiment, the present invention provides an electromagnetic clutch and pulley assembly for a motor vehicle engine comprising a pulley member, an electromagnetic coil assembly, and a clutch assembly. The pulley member is mounted for rotation about the shaft axis. The electromagnetic coil assembly is associated with the pulley member. The clutch assembly is constructed and arranged to selectively couple the pulley member to the shaft responsive to energizing and de-energizing the electromagnetic coil assembly. The clutch engagement assembly includes a hub constructed and arranged to be coupled to the shaft, and an armature disk operatively associated with the hub and axially spaced from the pulley member. The armature disk is axially movable into engagement with the pulley member when the electromagnetic coil assembly is energized. The armature disk has at least one magnetic field divider radially spaced from the axis, the at least one magnetic field divider being constructed and arranged to divide magnetic flux and thereby increase magnetic attraction forces generated by current through the electromagnetic coil assembly. Torsion transmitting structure is constructed and arranged to transmit torsional loads between the armature disk and the hub. The axially compressible resilient structure biases the armature disk axially away from the pulley member. The hub, the torsion transmitting structure, and the axially compressible resilient structure are disposed entirely radially inwardly of each of the at least one magnetic field divider. This construction is not only smaller, but can also be lighter than conventional clutch assemblies.

It is a further object of the present invention to provide a modular clutch assembly that can be easily adapted for several different applications. In accordance with this object, the present invention provides a clutch assembly constructed and arranged to couple a pulley member to a shaft when a electromagnetic coil assembly is energized. The clutch assembly includes a hub, an armature disk, torsion transmitting structure, and axially compressible resilient structure. The hub has a sleeve portion and a flange portion, the flange portion being fixed to the sleeve portion, the sleeve portion constructed and arranged to be drivingly coupled to the shaft. The armature disk is operatively associated with the hub, the armature disk being axially spaced from the pulley member when the electromagnetic coil assembly is de-energized, and being axially movable into engagement with the pulley member when the electromagnetic coil assembly is energized. The torsion transmitting structure transmits torsional movement of the armature disk to the flange portion of the hub, and hence the sleeve portion of the hub. The axially compressible resilient structure biases the armature disk axially away from the pulley member, the axially compressible resilient structure being constructed and arranged to be axially compressed to permit the armature disk to move into engagement with the pulley member and thereby enable the armature disk to be rotatably driven by the pulley member, and hence enable the armature disk to transmit rotation of the pulley member through the torsion transmitting structure to the hub and the shaft to drive the component in response to the electromagnetic coil assembly being energized. The hub is in contact with, but devoid of any connection to, the torsion transmitting structure and the axially compressible resilient structure.

Another object of the invention is to provide an electromagnetic clutch and pulley assembly which provides friction damping against resonant frequency vibration.

Another object of the invention is to provide an electromagnetic clutch assembly which is axially compact.

Other object and advantages of the present invention will become more apparent from the following detailed description and appended claims, wherein preferred embodiments are described.

DETAILED DESCRIPTION OF THE INVENTION

Figure 1:
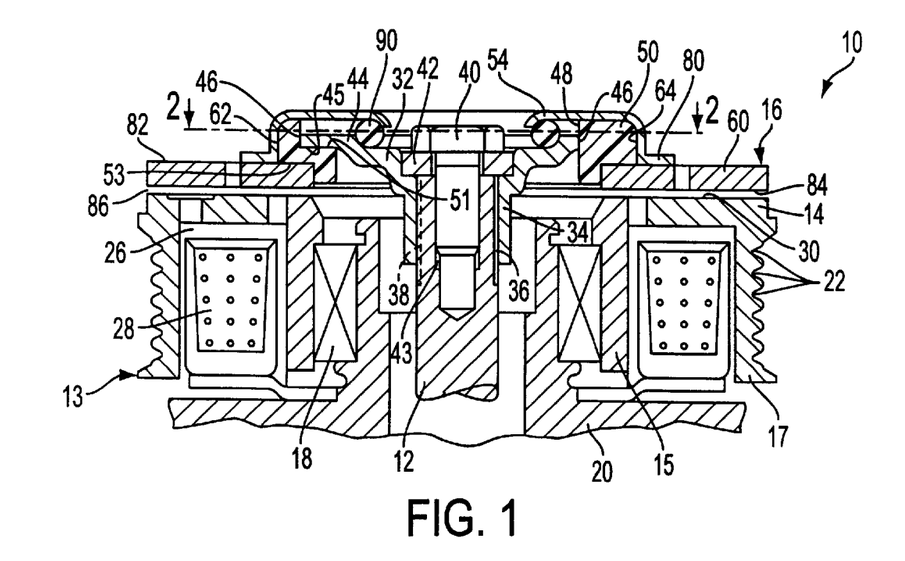
FIG. 1 is a cross sectional view taken along a plane through and parallel to a driven shaft axis of rotation on which an electromagnetic clutch and pulley assembly in accordance with the present invention is mounted.

Shown in FIG. 1 is an electromagnetic clutch and pulley assembly indicated generally at 10. The assembly 10 includes a pulley assembly 13 and an electromagnetic clutch assembly 16. The pulley assembly 13 includes a pulley member 14, which is driven for rotation by a flexible belt (not shown). The clutch assembly 16 is for coupling the pulley member to an input shaft 12 of a vehicle component (in this embodiment, an air conditioning compressor) to be driven.

In the embodiment shown, the pulley member 14 has an inner cylindrical wall 15 which mounts the pulley member 14 on a ball bearing assembly 18. The ball bearing assembly is, in turn, mounted on the housing or the casing 20 of the component to be driven. The pulley member 14 has poly-V grooves 22 along the generally outer cylindrical wall 17 thereof for engaging the teeth of a driving belt. In addition, the pulley member 14 is constructed and arranged to define a cavity 26 between walls 15 and 17 which receives a stationary electromagnetic coil 28, which is functionally cooperable with the clutch assembly 16. Clearance is provided between the pulley member 14 and the coil 28 to permit free rotation of the pulley member with respect to the enclosed coil 28. The pulley member 14 further comprises an annular friction surface 30 extending radially between walls 15 and 17. The friction surface 30 cooperates with the clutch assembly 16 as will be appreciated.

The clutch assembly 16 is mounted on the input shaft 12 and fixed for rotation therewith. More particularly, the clutch assembly 16 includes a central hub 32 having a sleeve portion 34 which is slid over the end of the input shaft 12. The input shaft 12 has circumferentially spaced grooves 36 extending parallel with the longitudinal axis of the shaft 12 and engaging corresponding ridges 38 provided on the interior surface of sleeve portion 34 to rotationally lock the hub 32 and entire clutch assembly 16 for rotation with the input shaft 12. The clutch assembly 16 is secured to the input shaft 12 by a threaded mounting bolt 40 received within a threaded bore 43 in the end of input shaft 12. An annular washer 42 cooperates with the mounting bolt 40 to rotatably lock the input shaft 12 with clutch assembly 16.

The hub 32 has a radially outwardly extending flange portion 44 which extends radially outwardly from the end of sleeve portion 34. The peripheral edge 46 of the flange portion 44 is disposed in engagement with the interior surface 48 of an annular torque coupling 50. This engagement is such as to permit axial sliding movement of the torque coupling 50 as will be described in greater detail later. Alternatively, there is a slight clearance fit relationship between the outer edge 46 of the hub 32 and the inner surface 48 of the torque coupling 50 throughout the peripheral interface there between so as to permit limited relative movement of the torque coupling 50 to the hub 32 in an axial direction.

The torque coupling member 50 is made from a non-magnetic material, and is preferably molded from a nylon family compound, such as ZYTEL™. The torque coupling member 50 operates in conjunction with the compression spring actuator 54 to constitute a torque coupling assembly 69 for transmitting torsional forces between the hub 32 and armature 60. Thus, the torque coupling assembly 69 is made from such a combination of non-ferritic and ferritic materials so as to insulate the magnetic zone from undesirable effects arising out of proximity of a ferritic structure of an annular compression spring actuator 54, which overlaps a portion of a ferritic structure of the hub 32 in a direction radially inwardly from the engaging surfaces 46 and 48.

The torque coupling 50 may have its surface 48 provided with a metallic or other friction resistant material so as to prevent wear of the coupling 50.

The torque coupling 50 has a configuration which engages the annular compression spring actuator 54 and an annular armature disc 60. The armature disc 60 has a plurality of circumferentially spaced arcuate slots 61 which divide the magnetic flux flow into two zones so as to multiply the magnetic attraction forces provided by the electromagnetic coil 28 when current flows therethrough. The arcuate slots 61 further provide a venting passage which connect the friction surfaces 30, 84 with outside air.

The torque coupling 50 has a radially outwardly facing annular exterior surface 62 which engages an annular interior surface 64 of the compression spring actuator 54.

Figure 2:
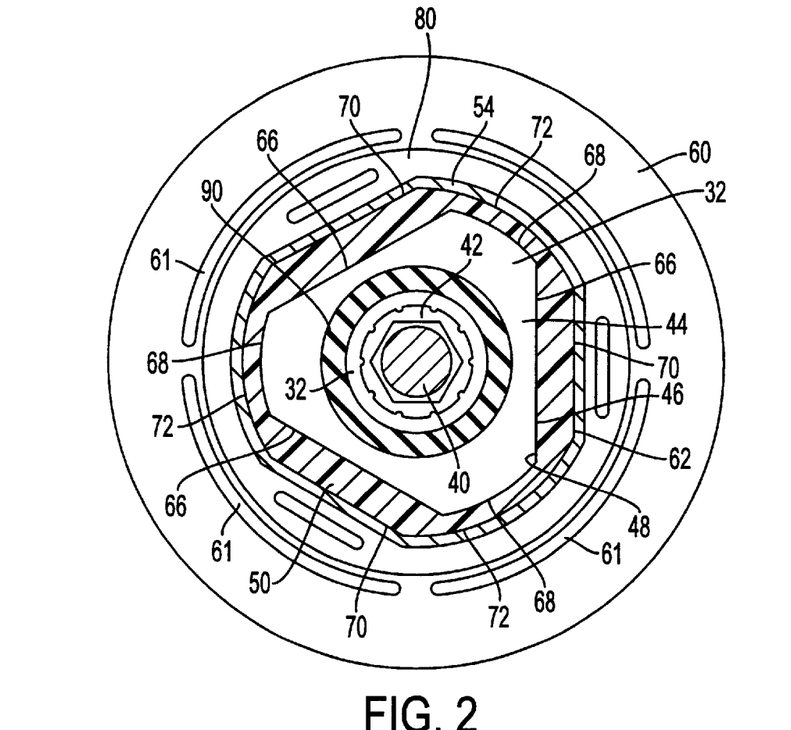
FIG. 2 is a cross sectional view taken through the line 2—2 in FIG. 1.

It can be appreciated from FIG. 2 that the outer edge 46 of the flange portion 44 of hub 32 has an irregular configuration which is nested within and engages the inner surface 48 of the torque coupling 50 in torque-transmitting fashion. More specifically, any rotational movement imparted to the torque coupling 50 is in turn imparted to the hub 32. In the embodiment shown, the interface between the hub 32 and the torque coupling 50 comprises a generally triangular configuration including three flat edges 66 and three interconnecting arcuate edges 68. Similarly, the radially outer surface 62 of the torque coupling 50 and the adjoining interior surface 64 of the compression spring actuator 54 are in peripheral engagement and have an irregular configuration which enables the compression spring actuator 54 to be fixed for a rotation with the torque coupling 50, such that any rotational input to the compression spring actuator 54 is transmitted to the torque coupling 50. As with the interface between the hub 32 and the torque coupling 50, the interface between the torque coupling 50 and the compression spring actuator 54 is of a generally triangular configuration, including three straight interfacing surfaces 70, and three intervening or interconnecting arcuate interfacing surfaces 72.

The compression spring actuator 54 has an outward or peripheral flange 80 which is preferably welded or otherwise fixed to the axially outwardly facing surface 82 of the armature disc 60. The compression spring actuator 54 is preferably welded to the armature disc 60 by a capacitor-discharge welding method which generalizes localized heat concentration not affecting surrounding components of the clutch assembly 16. The armature disc 60 has an annular friction surface 84 which is opposite the aforementioned surface 82.

The friction surface 84 is normally spaced from the friction surface 30 of the pulley member 14 by a gap 86.

As shown, a compression spring member 90 is disposed between the flange portion 44 of the hub 32 and the compression spring actuator 54 so as to bias the compression spring actuator 54 and the armature disc 60 connected therewith an axial direction away from the pulley member 14. As a result, the gap 86 between surfaces 84 and 30 is maintained via the spring member 90. The compression spring member 90 is pre-compressed between the compression spring actuator 54 and the hub 32, so that the compression spring actuator 54 is preset a predetermined axial distance from the flange portion 44 of the hub 32, as limited by the engagement between surface 45 of the flange 44 and surface 51 of the torque coupling 50. The torque coupling 50 also has a flat surface 53, which is on the opposite side of torque coupling 50 relative to surface 51. The surfaces 51 and 53 are molded to be parallel to one another, and are also parallel to the underside surface 45 of the hub 32 in the assembled configuration. These parallel surfaces are perpendicular to the axis of shaft 12.

The gap 86 can be minimized and accurately maintained as a result of the fact that accurate parallel surfaces 45, 51, and 53 are used by the spring member 90 in biasing the armature disc 60. Armature disc 60 is ground to have flat surfaces 82, 84 which are also parallel to surfaces 45, 51, 53; and also parallel to friction surface 30. In addition, the accuracy of moving parallel surfaces in the axial direction can be maintained because, while the spring member 90 functions to oppose axial movement of the armature disc 60 of clutch assembly 16 into torque-transmitting engagement with the pulley 14, it does not function in torque transmission of the clutch assembly 16 between the pulley 14 and the shaft 12 when the clutch assembly 16 is activated. Thus, the axial bias of the spring member 90 is not distorted by any torsional requirements thereof so that the compression spring rate can be tuned to meet specific requirements without affecting the torsional function.

In the preferred embodiment shown, the spring member 90 is resilient, rubber O-ring. The compression spring actuator 54 is disposed in overlapping relationship with the spring member 90 and has a radially inner edge which provides access to the mounting bolt 40 used for fixing the clutch assembly 16 to the driven shaft 12. The spring member 90 can also be made from spring steel.

The operation of the electromagnetic clutch and pulley assembly 10 will now be described.

In the configuration shown in FIG. 1, the pulley member 14 is not rotationally coupled with the input shaft 12. Upon providing an appropriate current through the electromagnetic coil 28 to activate the clutch assembly 16, however, the armature disc 60 will be attracted by the magnetic force generated by the current through the coil 28. As a result, the friction surface 84 of the armature disc 60 and the friction surface 30 of the pulley member 14 will be brought into engagement with one another. More particularly, the armature disc 60 will move axially inwardly toward the pulley member 14, overcoming the bias of the spring member 90. The spring member 90 is compressed, and the surface 48 of the torque coupling 50 is slid along the edge 46 of the hub 32 until the friction surface 84 of the armature disc 60 is brought into engagement with the friction surface 30 of the pulley member 14, thus eliminating the gap 86. The frictional engagement between surface 84 and surface 30 causes the pulley member 14 to be rotatably coupled with the shaft 12, such that rotational movement imparted to the pulley member 14 by a driven belt will be transmitted to the input shaft 12 through the clutch assembly 16.

The construction of the present invention has many advantageous features. First, it should be noted that relatively few components are required to manufacture the clutch assembly 16. These components include the armature disc 60, the compression spring actuator 54, the torque coupling 50, the hub 32, and the spring member 90.

A further advantage is that the gap 86 between the friction surfaces 84 and 30 can be minimized, yet accurately maintained. More particularly, the spring member 90 biases the armature disc 60 away from the friction surface 30, but is limited by the engagement of an axially facing underside surface 45 of the flange portion 44 with a parallel, axially facing surface 51 of the torque coupling 50. In addition, the clutch assembly 16 is rivetless and precisely manufacturable so as to maintain an accurate minimal gap 86. The small gap 86 prevents larger, potentially damage-causing particles of road contaminates such as salt, dust, and dirt from entering the frictionally engagement area between surfaces 84 and 30. As a further benefit, because a small gap is provided, thus requiring less travel distance for engagement of friction surfaces 84 and 30, the engagement time for the friction surfaces 84 and 30 is reduced. In addition, because travel time for engagement of the friction surfaces is reduced, and the impact of frictional engagement is dampened by the spring member 90, relatively little noise is generated when friction surface 84 is moved into engagement with friction surface 30.

This narrow gap is also enabled partially due to the fact that a very accurate clutch assembly 16 can be manufactured without the harmful dimensional variation inherent in the prior designs using molded elastomer spring which is vulcanized or bonded to metal flanges. The effects of uneven thickness of rubber bumpers, or the distortion from riveting as with conventional clutch assemblies also are eliminated.

The spring member 90 also provides an advantage in that it forms a seal between the spring actuator 54 and the hub 32 so as to prevent particular contaminates from reaching the clearance fit between the edge 46 of hub 32 and surface 48 of torque coupling 50. Thus, contaminants cannot reach the internal components of the assembly 10.

Figure 3:
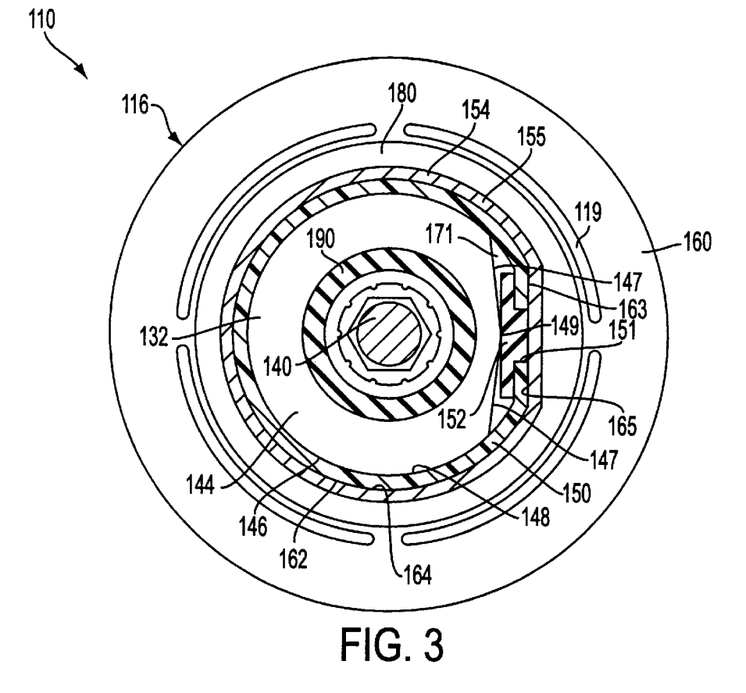
FIG. 3 is a cross-sectional view similar to that in FIG. 2, but in accordance with a second embodiment of the present invention.

FIG. 3 is a cross-section view similar to FIG. 2, but showing an alternate embodiment of the present invention. FIG. 3 shows an electromagnetic clutch and pulley assembly 110, which includes a clutch assembly 116 secured to a driven shaft (not shown) by a mounting bolt 140 and washer 142. The clutch assembly 116 includes an armature disc 160 having a plurality of circumferentially spaced arcuate grooves 119. A compression spring actuator 154 has an annular flange 180 which is welded to the armature disc 160. The compression spring actuator 154 has an axially extending annular wall 155. The wall 155 has a radially inwardly facing inner surface 164, which is generally cylindrical, with the exception of a flattened portion 165.

An annular torque coupling 150 is received within this compression spring actuator 154 so as to be rotationally coupled therewith as in the first embodiment. The torque coupling 150 has a generally cylindrical radially outwardly facing surface portion 162 which engages the generally cylindrical surface portion 164 of the spring actuator 154. The torque coupling 150 also has a radially outwardly facing flattened surface portion 163 which engages the flattened surface portion 165 of the spring actuator 154.

The flattened surface portion 163 of torque coupling 150 has a recess 151 which receives a resilient, preferably rubber, bumper 152. A shaft mounted hub 132 has the annular flange portion 144 thereof provided with a break in its generally circular outer edge 146, such that it provides a pair of flattened edges 147 which meet at an adjoining point 149. The flattened edges 147 cooperate with the adjacent flattened portions of the spring actuator 154 to define a recess 171 in which the bumper 152 is received. The point 149 on the flange 144 engages the bumper 152 at all times.

The torque coupling 150 has a generally cylindrical inner surface portion 148 which engages the peripheral circular edge portion 146 of the flange portion 144 of the hub 132.

A compression spring member 190 operates much in the same manner as in the first embodiment, and the clutch assembly 116 is secured to and input shaft (not shown) by a mounting bolt 140.

In the embodiment of FIG. 3, it can be appreciated that limited relative rotational movement between the armature disc 160 and the hub 132 is permitted in either direction until the bumper 152 is compressed by one of the flat edges 147 proportionally to the applied torque depending upon the rotational movement direction force on bumper (the force on the bumper is neutral in FIG. 3). This slight relative movement provides for a softer torque transition during clutch engage and disengage, so as to reduce wear of the system.

Figure 4:
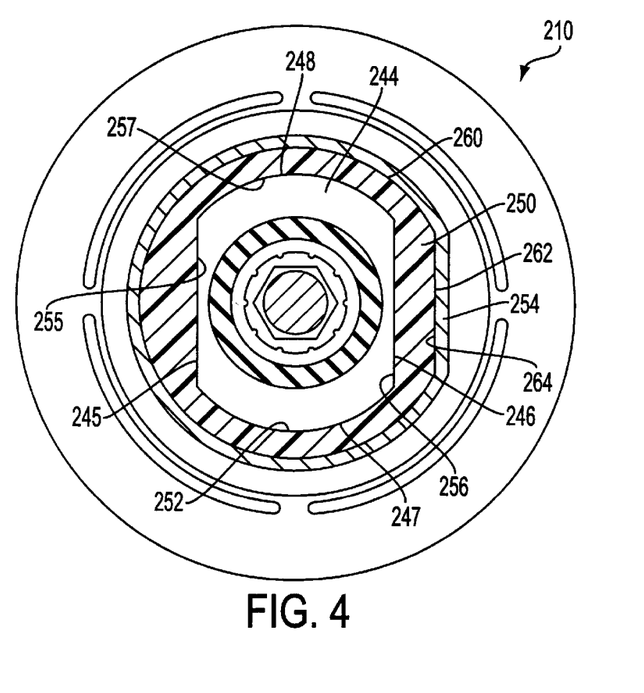
FIG. 4 is a cross-sectional view similar to that in FIG. 2, but in accordance with a third embodiment of the present invention.

Finally, FIG. 4 shows a third embodiment of an electromagnetic and pulley assembly 210. In this embodiment, the torque coupling 250, the hub flange 244, and the rotationally engaging portions of the compression spring actuator 254 have an alternate torque engaging configuration. More particularly, the hub flange 244 has two opposing flat surfaces 245 and 246, as well as two opposing arcuate surfaces 247 and 248. The flat surfaces 245, 246 of the flange 244 engage corresponding flat surfaces 255, 256 of the surrounding torque coupling 250. In addition, the arcuate surfaces 247, 248 of the flange 244 engage corresponding arcuate surfaces 252 and 257 of the torque coupling 250 to rotationally couple these two elements.

The torque coupling 250 has a generally circular or cylindrical outer or peripheral surface 260, with a single flat edge 262. This flat edge 262 engages an adjacent flat edge 264 of the compression spring actuator 254 to rotationally couple the compression spring actuator 254 with the torque coupling 250.

Figure 5:
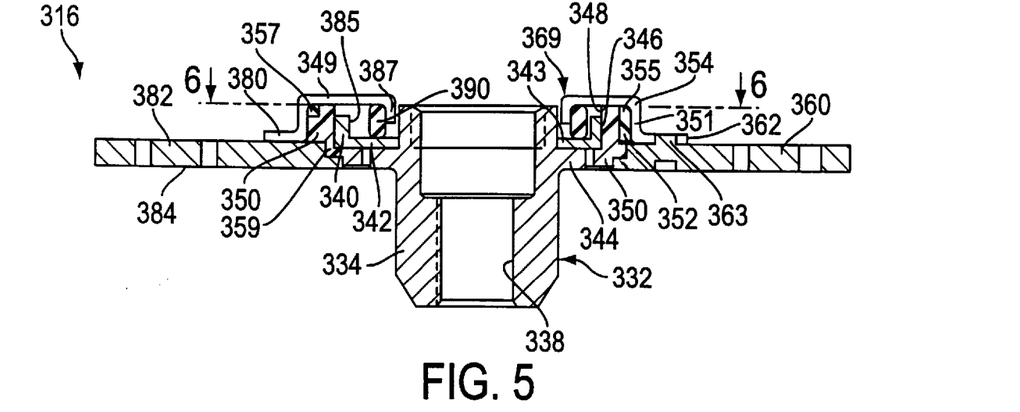
FIG. 5 is a partial cross-sectional view of a clutch assembly used in conjunction with a pulley assembly identical to that in FIG. 1, in accordance with a fourth embodiment of the present invention.
Figure 6:
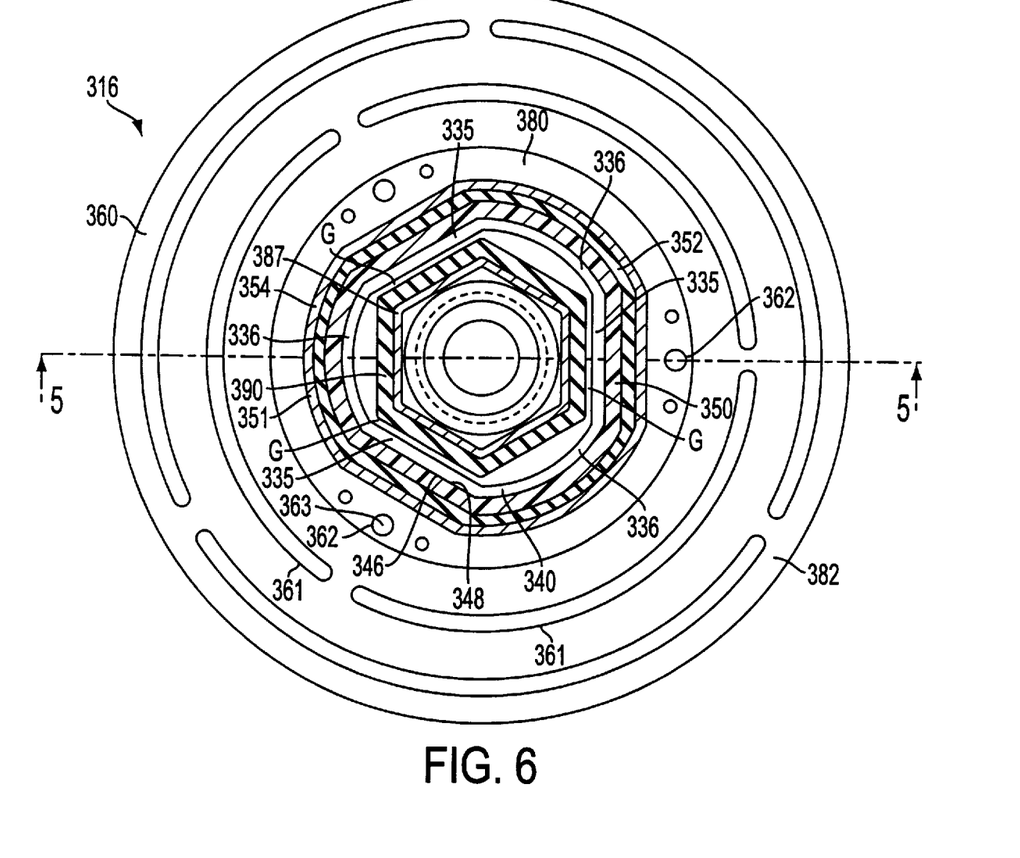
FIG. 6 is a partial cross-sectional view taken through the line 6—6 in FIG. 5.

Shown in FIGS. 5 and 6 is a fourth embodiment of the present invention. For simplicity, FIG. 5 illustrates only the clutch assembly portion of the system, as generally indicated at 316, it being understood that this clutch assembly 316 is to be used in conjunction with a pulley assembly having internal coil windings as was illustrated at 13 in FIG. 1.

The clutch assembly 316 is constructed and arranged to be mounted on an input shaft (not shown in FIG. 5) and fixed for rotation therewith. More particularly, the clutch assembly 316 includes a central steel or aluminum hub 332 having a sleeve portion 334 which provides an interference fit mounting to rotatably lock the shaft with clutch assembly 316. As with the first embodiment, it is preferred for the input shaft to have circumferentially spaced grooves extending parallel with the longitudinal axis of the shaft and engaging corresponding ridges 338 provided on the interior surface of sleeve portion 334 to rotationally lock the hub 332 and entire clutch assembly 316 for rotation with the input shaft.

The hub 332 has a radially outwardly extending flange portion 344 which extends radially outwardly from sleeve portion 334. A metal, generally triangular flange portion 343 (preferably steel or aluminum) is fixed, e.g., by being welded, to an outer or upper surface of the flange portion 344. The flange 343 has a radially extending base portion 342 and an axially outwardly extending wall portion 340. The radially inner edge of the radially extending base portion 342 abuts against the cylindrical sleeve portion 334 of the hub 332. The axially outwardly extending wall portion 340 has an annular configuration which can be best described as generally triangular, but with relatively extensive arcuate or curved corners. This can be best appreciated from FIG. 6, which is a cross sectional view taken along the line 6—6 in FIG. 5. As illustrated in FIG. 6, the wall portion 340 of the flange 343 can be said to have three straight wall portions 335 and three intervening arcuate portions 336. It should be understood that both the hub 332 and the flange 343 can be made as a single piece unit without any joint (weldment) between them.

The radially outwardly facing surface 346 of the wall portion 340 is disposed in engagement with the interior surface 348 of an annular torque coupling 350. This engagement is such as to permit axial sliding movement of the torque coupling 350 against surface 346 of the hub flange 343 as will be described in greater detail later. Alternatively, there is a slight clearance fit relationship between the outer edge 346 of the hub 332 and the inner surface 348 of the torque coupling 350 throughout the peripheral interface there between so as to permit limited relative movement of the torque coupling 350 to the hub 332 in an axial direction with very low friction involved.

As with the previous embodiments, the torque coupling 350 is made from a non-magnetic material, and is preferably molded from a nylon family compound, such as ZYTEL™. The torque coupling member 350, together with the hub flange 343, resilient bumper 352 and the spring actuator 354 constitute a torque coupling assembly 369 for transmitting rotation from the hub 332 to the armature 360. It should be appreciated that the torque coupling assembly 369 is made from a particular combination and configuration of non-ferritic and ferritic materials so as to insulate the magnetic zone from the undesirable effects arising out of contact or close proximity of ferritic components engaged in a torsionally, axially slidable relationship with the armature plate 360.

The torque coupling 350 may have its surface 348 provided with a metallic or other friction resistant material so as to prevent wear of the coupling 350.

A resilient bumper 352, preferably made of a rubber material, is disposed between the torque coupling 350 and an radially outer axially extending wall 351 of the spring actuator 354. As can be appreciated from FIG. 6, each of the torque coupling 350, the resilient bumper 352, and the outer wall 351 of the spring actuator have generally the same annular shape as the aforementioned triangular shape having arcuate corners of the wall portion 340 of the retaining ring 343.

The resilient bumper is of altering heights as viewed in FIG. 5. More particularly, towards the right side of FIG. 5, where the bumper 352 has a substantially straight annular extent as seen in FIG. 6, the bumper has a height which extends vertically between the upper wall 349 of the spring actuator 354 and an annular step 391 provided in the torque coupling. Alternately, this portion of the bumper may extend between the upper wall 349 and a step formed in the armature disc 360 itself.

On the other hand, towards the left side of FIG. 5, where the bumper 352 has a substantially arcuate annular extent as seen in FIG. 6, the bumper has a height which extends from the upper wall 349 only partially towards the armature disc 360, with portions of the torque coupling 350 extending beneath the bumper 352 to directly engage the radially inwardly facing surface of outer wall 351 of the spring actuator 354. It thus can be appreciated that the bumper 352 has three regions of greater height 355 (along a part of each of the straight portions thereof) and three intervening regions of lesser height 357 (along the arcuate portions thereof).

The lesser height regions 357 are preferably slightly pre-compressed to bias the torque coupling 350 away from the wall 349 of spring actuator 354, such that (as viewed in FIG. 5) an axially downwardly facing annular surface portion of the torque coupling 350 engages an axially upwardly facing annular surface portion of the armature 360 at the annular surface interface indicated by reference numeral 359. The forced friction between the torque coupling 350 and the armature 360 at interface 359 provides damping against resonant frequency torsional vibration that may be generated in the system, such as in the hub 332 or armature 360.

The torque coupling 350, the adjoining interior surface areas of the compression spring actuator wall 351, and the resilient bumper 352 therebetween all have an irregular interengaging configuration the enables the compression spring actuator 354 to be coupled for rotation with the torque coupling 350, such that any rotational input to the compression spring actuator 354 is transmitted to the torque coupling 350.

As with the interface between the hub flange 343 and the torque coupling 350, the interface between the torque coupling 350 and the compression spring actuator 354 and the intervening bumper 352 is preferably of a generally triangular configuration, including three straight interfacing surfaces and three intervening or interconnecting arcuate surfaces. Some limited relative torsional movement between the spring actuator 354 and the torque coupling 350 is permitted in either direction as permitted by compression of the intervening resilient bumper 352 along the straight portions of interface. The arcuate portions of interface between the spring actuator 354, torque coupling 350 and resilient bumper 352 permits slight relative sliding engagement between the contacting arcuate surfaces of the torque coupling 350 and spring actuator wall 351, so that the leading adjacent straight portions of the torque coupling compress the intervening bumper 352 against the opposing straight portions of the spring actuator wall prior to torque transmission. This dampens torsion transmitting effects between the spring actuator 354 and the torque coupling 350. This slight relative movement provides for a softer torque transition during clutch engage and disengage, so as to reduce wear of the system. It should be appreciated that the bumper 352 provides this damping effect by compression of rubber material as opposed to sheer. This prolongs the life of this torsion damping member.

The armature disc 360 has a plurality of circumferentially spaced arcuate slots 361 which divide the magnetic flux flow into zones that multiply the magnetic attraction forces provided by the electromagnetic coil of the pulley assembly when current flows therethrough. The arcuate slots 361 (sometimes referred to as pole slots, field dividing gaps, field slots, etc.) further provide a venting passage which connect the friction surfaces between the armature 360 and pulley with outside air.

The spring actuator 354 is also provided with a plurality of openings 362 which receive corresponding projections 363 formed on the armature disc to further provide rotational coupling therebetween. The projections 363 serve as rivets to stake or fix the flange 380 to the armature 360. In an alternate contemplated embodiment, flange 380 of the spring actuator 354 can be welded to the surface 382 of the armature.

The construction of the present invention provides a very compact radial construction for rotationally coupling the hub 332 with the armature and for enabling the axial movement of the armature. Specifically, as seen in FIG. 5, all components for accomplishing these functions are radially contained within the radially innermost magnetic flux dividing regions 361. It should be appreciated that these magnetic flux dividing regions need not be limited to air gaps, but can be any known construction, such as being filled with non-magnetic material.

It can be appreciated from FIG. 6 that the radially outwardly facing surface 346 of the hub flange 343 has an irregular configuration which engages the inner surface 348 of the torque coupling 350 in torque-transmitting fashion. As a result, any rotational movement imparted to the torque coupling 350 is in turn imparted to the hub 332 connected to flange 343. In the embodiment shown, the interface between the hub flange 343 and the torque coupling 350 comprises a generally triangular configuration including altering straight and arcuate surfaces. In the preferred embodiment shown, three straight surfaces edges and three intervening arcuate surfaces are provided.

The compression spring actuator 354 has an outward or peripheral flange 380 which is welded to the axially outwardly facing surface 382 of the armature disc 360. The compression spring actuator 354 is preferably welded to the armature disc 360 by a capacitor-discharge welding method which generalizes localized heat concentration not affecting surrounding components of the clutch assembly 316. The armature disc 360 has an annular friction surface 384 which is opposite the aforementioned surface 382. The friction surface 384 is normally spaced from the friction surface 30 of the pulley member by a gap, as with the first embodiment.

As shown, an annular compression spring member 390 is disposed between the radially inwardly facing surface 385 of the wall portion 340 of retaining member 343 and a radially inwardly disposed annular flange 387 of the compression spring actuator 354. The spring is loosely disposed around annular flange 387, which simply acts a locator for the spring 390. The spring 390 is annularly spaced about its periphery from wall portion 340. Both the annular flange 387 and the surroundingly engaged annular compression spring member 390 preferably have a hexagonal annular shape. In the preferred embodiment, the spring member 390 is made from a resilient, rubber material.

The compression spring 390 biases the compression spring actuator 354 and the armature disc 360 connected therewith in an axial direction away from the associated pulley member. As a result, the gap between the friction surface of the pulley and friction surface 384 of the armature is maintained via the spring member 390. The compression spring member 390 is pre-compressed between the compression spring actuator 354 and the hub retaining member 343 fixed to the hub 332, so that the compression spring actuator 354 is preset a predetermined axial distance from the upper edge of the vertical wall 340 of the hub flange 343, as limited by the engagement between base portion 342 of the hub flange 343 and the underlying flat surface of the torque coupling 350. The torque coupling 350 also has another flat surface opposite and parallel the aforementioned flat surface, and which is on the opposite side of torque coupling 350. The flat surfaces are molded to be parallel not only to one another, but also parallel to the facing surface of the base portion 342 in the assembled configuration. These parallel surfaces are perpendicular to the axis of the shaft to be driven.

The gap between the pulley and the armature can be minimized and accurately maintained as a result of the aforementioned parallel surfaces and the spring 390 as described in the first embodiment.

In addition, the accuracy of moving parallel surfaces in the axial direction can be maintained because, while the spring 390 functions to oppose axial movement of the armature disc 360 of clutch assembly 316 into torque-transmitting engagement with the pulley, it does not function in torque transmission of the clutch assembly 316 between the pulley and the shaft when the clutch assembly is activated. Thus, the axial bias of the spring 390 is not distorted by any torsional requirements thereof.

It should be noted that the three small radial gaps G between the radially outer surface of the spring 390 and the three straight wall portions of vertical wall 340 are sufficiently large to preclude the spring 390 from contacting the vertical wall 340 when the spring 390 is slightly radially bulged during axial compression thereof when the clutch is engaged.

Importantly, because the spring 390 does not function in any respect to torque transmission between the pulley and the hub 332, the spring 390 can be very accurately tuned axially to 1) reduce axial impact of the engagement between friction surface 384 and the adjacent friction surface of the pulley, and 2) to increase the speed of disengagement between such friction surfaces. Increasing the speed of disengagement reduces noise that otherwise results from the residual magnetism delaying the separation of friction surfaces and the resultant rubbing of such surfaces. Reducing axial impact also reduces noise during engagement.

Because the torque transmission is independent from axial compression of the spring 390, the spring does not need to be designed to accommodate sheer or compression for torsional transmission. As a result, the spring 390 can be less robust, as a result, smaller in the axial dimension. Thus, the entire clutch assembly 316 can be made smaller axially, as well as radially as discussed previously.

The operation of the electromagnetic clutch and pulley assembly in accordance with this embodiment will now be described.

Upon providing an appropriate current through the electromagnetic coil in the pulley assembly, the armature disc 360 will be attracted by the generated magnetic force. As a result, the friction surface 384 of the armature disc 360 and the adjacent friction surface of the pulley member will be brought into engagement with one another. More particularly, the armature disc 360 will move axially inwardly toward the pulley member, overcoming the bias of the spring member 390. The spring member 390 is further compressed from its pre-compressed state, and the surface 348 of the torque coupling 350 is slid along the surface 346 of the hub flange 343 until the friction surface 384 of the armature disc 360 is moved into engagement with the friction surface of the pulley member. The pulley member is thus rotatably coupled with the associated shaft, such that rotational movement imparted to the pulley member by a driven belt will be transmitted to the input shaft through the clutch assembly 316.

For this embodiment, as with the first embodiment, it should again be noted that relatively few components are required to manufacture. In addition, the gap between the friction surfaces 384 and that of the adjacent pulley can be minimized and accurately maintained. In addition, the clutch assembly 316 is rivetless and precisely manufacturable so as to maintain such accurate minimal gap, thus reducing travel distance and noise for engagement of friction surfaces. Again because no molded elastomer spring which is vulcanized or bonded to metal flanges is provided, no dimensional variation or potential failure by debonding of such spring can occur.

The spring member 390 also provides an advantage in that it forms a seal between the spring actuator 354 and the hub 332 so as to prevent particular contaminates from reaching the internal components of the assembly.

Similarly the elastomer bumper 352 provides the seal function between the spring actuator 354 and the torque coupling 350.

Figure 7:
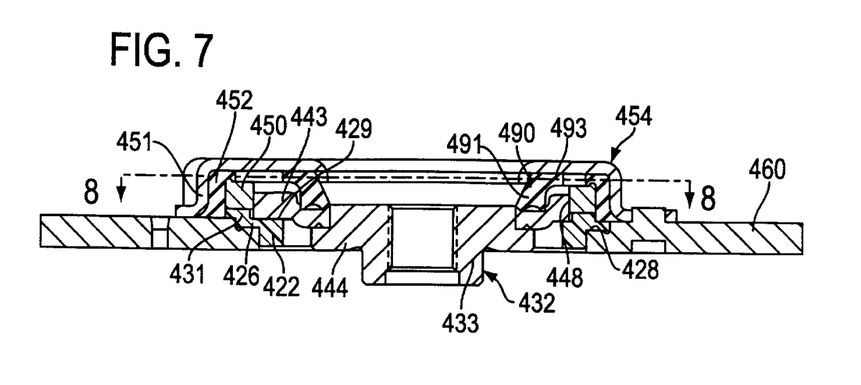
FIG. 7 is a cross-sectional view of a clutch assembly used in conjunction with a pulley assembly identical to that in FIG. 1, in accordance with the fifth embodiment of the present invention, and taken through the line 7—7 in FIG. 8.
Figure 8:
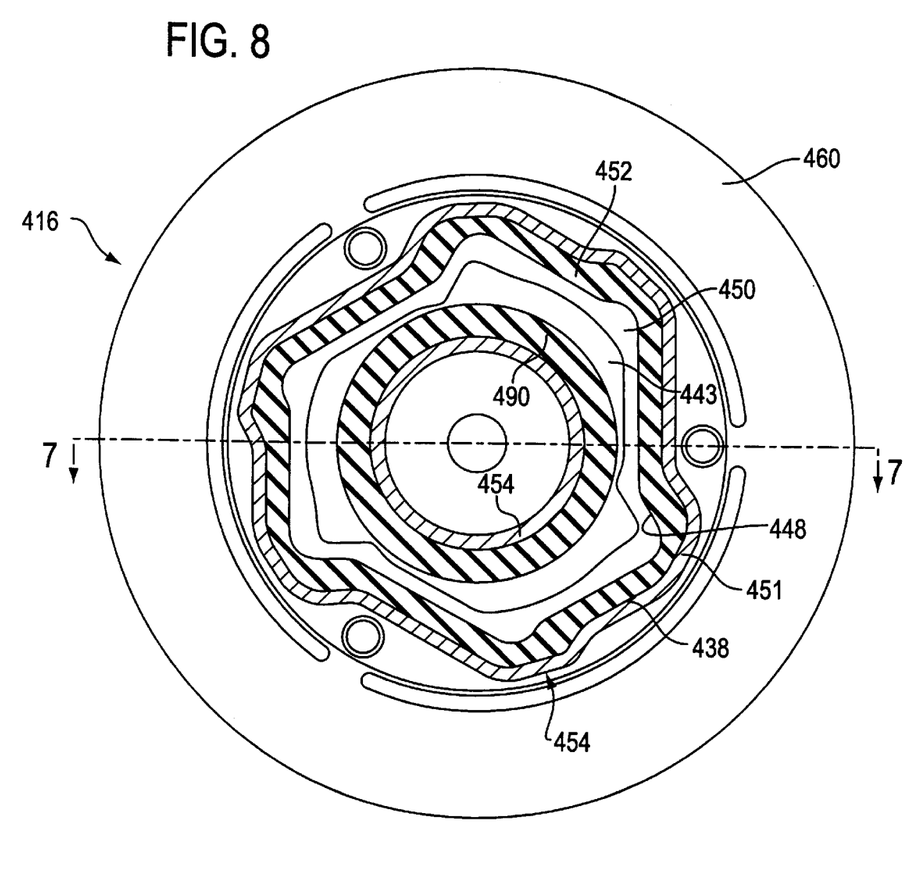
FIG. 8 is a cross-sectional view taken through the line 8—8 in FIG. 7.
Figure 9:
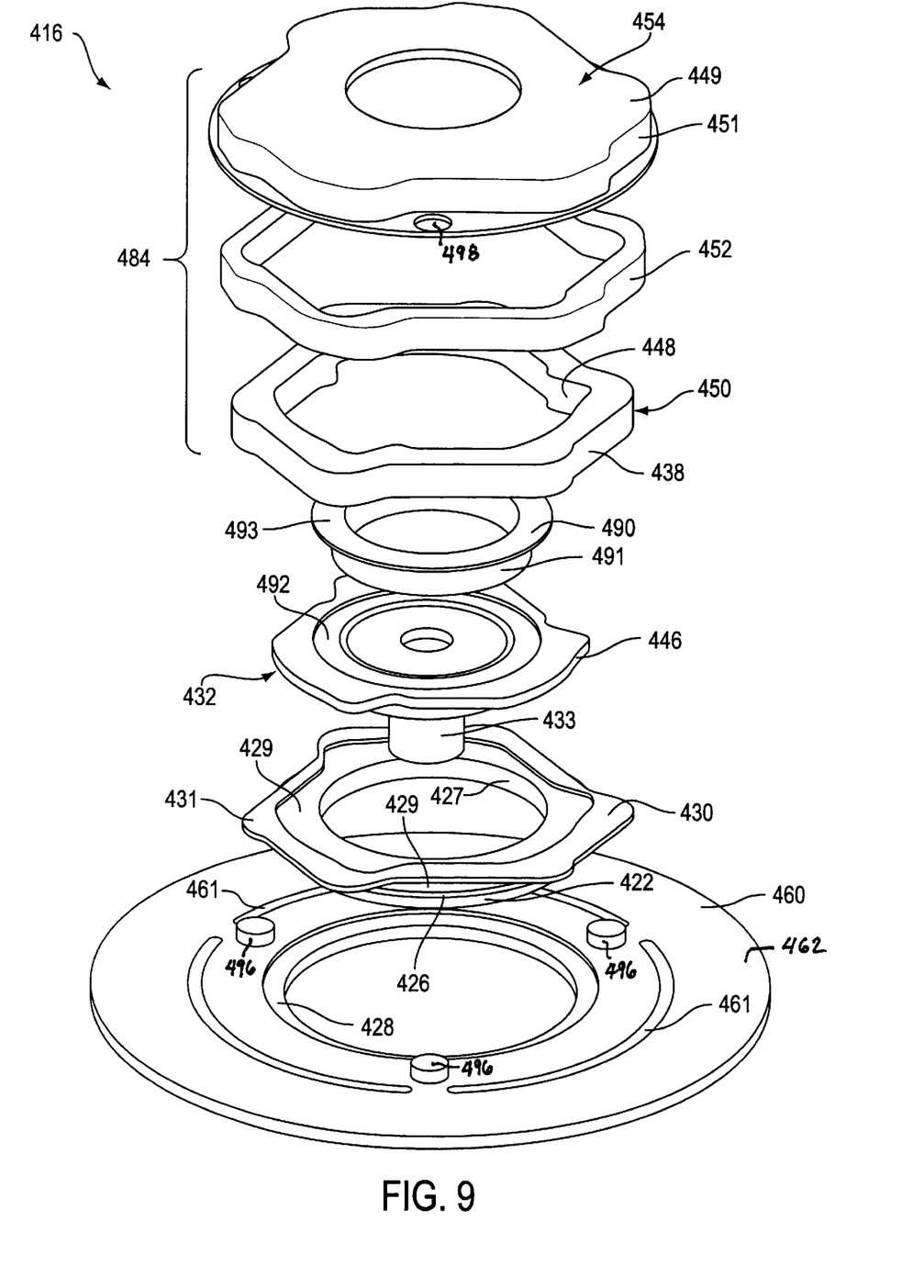
FIG. 9 is an exploded view of the fifth embodiment of the present invention illustrated in FIGS. 7 and 8.

Shown in FIGS. 7–9 is a fifth embodiment of the present invention. For simplicity, these figures illustrate only the clutch assembly portion of the system, as generally indicated at 416, it being understood that this clutch assembly 416 is to be used in conjunction with a pulley assembly 13 having internal coil windings as illustrated in FIG. 1.

The fifth embodiment illustrated in FIGS. 7–9 is substantially similar to the previous embodiments, and therefore, only the significant differences in this embodiment will be pointed out.

As shown, the clutch assembly 416 includes a central steel or aluminum hub 432. As with the fourth embodiment, the hub 432 is preferably of a two-part construction, including a first main portion 433, and a second flanged member 443 welded to the flange portion 444 of the first main portion 433. The main portion 433 has a sleeve portion 436 for being coupled to a shaft and a radially outwardly extending flange portion 444 integrally formed with the sleeve portion 436.

Referring to FIG. 9, it can be appreciated that the clutch assembly 416 includes a armature disk 460 having arcuate magnetic field divider slots 461. The radially innermost edge of the upper surface of armature disk 460 defines a recessed annular shoulder 428.

A spacer member 430 is preferably integrally formed from a molded plastic material. The spacer 430 has a lower circular ring portion 422 which is received within the central aperture 424 of the armature disk 460. The spacer 430 further comprises an intermediate ring portion 426 having a common inner edge 427 with the lower ring portion 422, but being of slightly larger diameter than the lower ring portion 422. The intermediate ring portion 426 is of slightly lesser thickness in the axial direction than the lower ring portion 422, and has a lower surface that is seated upon the annular shoulder 428 of the armature disk 460. The spacer 430 further comprises an upper annular structure 431 having an irregular annular configuration, which is preferably integrally molded with and extending from the upper surface 429 of the intermediate ring portion 426. Certain portions of the upper structure 431 extend radially outwardly beyond the outermost periphery of the intermediate ring portion 426, and are thus disposed in overlying relation with portions of the upper surface 462 of the armature disk 460. The upper structure 431 defines an outer boundary for a portion of the upper surface 429 of the intermediate ring portion 426, which surface portion 429 serves to seat the lower surface of the flange member 443 of the hub 432.

An axially compressible resilient structure 490 rests upon the upper surface of the hub 432, and particularly rests upon the upper surface of the flange member 443. The axially compressible resilient 490 acts as an axially compressible compression spring, as described previously. The member 490 has a substantially circular configuration, including a downwardly depending portion 491, which is received and located by a circular recess 492 formed in the upper surface of the flange 443.

The axially compressible resilient structure 490 has somewhat of a conical radially inner surface, and a radially extending upper flange portion 493.

A spring actuator structure 454 is fixed to the armature disk 460, as described previously. The axially compressible resilient structure 490 is axially precompressed between the spring engaging wall 449 of the spring actuator 454 and the flange 443 of the hub 432.

The clutch assembly further includes torsion transmitting structure 484, which transmits torsional movement of the armature disk 460 to the hub 432. In the broader aspects of the present invention, it should be appreciated that the torque transmitting structure may comprise any structure (singular or plural) that can be disposed for transmitting torsional movement of the armature disk 460 to the hub 432. A torsion transmitting structure need not included any resilient torsion damping component, and may comprise any sort of means for torsionally coupling the hub 432 to the armature disk 460, so long as such coupling permits relative axial movement of the hub 432 relative to the armature disk 460.

In the preferred embodiment, it can be appreciated that the torsion transmitting structure 484 comprises a first rigid structure in the form of the spring actuator 454 that is fixed to the armature disk 460, and a second rigid structure in the form of a torque coupling 450, which torque coupling 450 is disposed between the hub 432 and the spring actuator 454, for transmitting torsional movement therebetween. The preferred torsion transmitting structure 484 also preferably includes a resilient torsion damper member 452 disposed between the first rigid structure (i.e., the outer wall 451 of the spring actuator 454) and the second rigid structure (i.e., the torque coupling 450). A resilient torsion damping member 452 dampens torsional vibration between the hub 432 and the armature disk 460. In addition, this torsion damping member 452 reduces the peak torsional load between the hub 432 and the armature disk 460.

As shown, the radially inner surface 448 of the torque coupling 450 engages the radially outer surface or edge 446 of the hub flange 443, so that the torque coupling 450 and the hub 432 are coupled for torsional movement with one another. The torque coupling 450 may be made from a material selected from the group consisting of steel, ceramic, plastic, and aluminum. The most preferred material is steel.

The torsion damper member 452 is disposed between the outer wall 451 of the spring actuator 454 and the radially outer surface 438 of the torque coupling 450. The torsion damper member 452 is compressed at circumferentially spaced locations between the wall 451 of the spring actuator 454 and the outer surface 438 of the torque coupling 450 when the armature disk 460 is engaged and driven by the pulley assembly 13 and torque is transmitted through the torsion transmitting structure 484 from the armature disk 460 to the hub 432.

The axially compressible resilient structure 490 is in non-torsion transmitting relation with respect to the hub 432 and the armature disk 460, as the entire torsional load is received and transmitted by the torsion transmitting structure 484. In addition, the axially compressible resilient structure 490 constitutes the sole structure that biases the armature disk 460 axially away from the pulley member 14. Thus, the sole structure that biases the armature disk 460 axially away from the pulley member 14 (i.e., the axially compressible resilient structure 490) is substantially isolated from torsional transmission between the armature disk 460 and hub 432.

The spacer 430 is capable of limited rotational movement relative to the armature disk 460 when the armature disk 460 is rotatably driven by the pulley member 14. As a result, friction between the spacer 430 and the armature disk 460 during the limited relative movement therebetween adds friction type damping of torsional transmission from the armature disk 460 to the hub 432. This can be in addition to the resilient damping of the resilient damper 452 as in the embodiment shown or, in other contemplated embodiments that are not shown, the friction type damping can be the primary or the sole means of damping.

The axially compressible resilient structure 490 as described and shown herein is preferably constructed such that it has a variable spring rate such that an initial spring rate applies a predetermined resistance to movement of the armature disk 460 towards the pulley member 14 when the electromagnetic coil is energized. After the armature disk 460 has accelerated a predetermined distance towards the pulley member 14, a subsequent spring rate of the resilient structure 490 applies a greater resistance to movement of the armature disk 460 which is greater than the predetermined resistance to movement of the armature disk 460 towards the pulley member 14. Thus, the acceleration of the armature disk 460 towards the pulley member 14 decreases after the armature disk 460 has moved the predetermined distance towards the pulley member 14.

In accordance with another aspect of the present invention, as discussed previously, the hub 432, the torsion transmitting structure 484, and the axially compressible resilient structure 490 are all disposed entirely radially inwardly of each of the magnetic field dividers 461.

As another feature of the present invention, it should be appreciated that the hub 432 is in contact with, but devoid of any connection to, the torsion transmitting structure 484 and the axially compressible resilient structure 490. The flange member 443 of the hub 432 is the portion of the hub which makes contact with these components. It can be appreciated, therefore, that because the sleeve portion 436 and flange portion 444 do not directly interface with any of the other components of the clutch assembly 416, that this portion of the hub 432 can be changed or modified to fit different applications. This may simplify and reduce costs associated with manufacturing of the clutch assembly. For example, all of the components illustrated in FIGS. 7–9, with the exception of the first main portion 433 of the hub, can be mass produced in large quantities. Only the first main portion 433 of the hub 432 needs to be changed, and then welded to the standard flange member 443, in order for the clutch assembly 416 to be adapted for mounting on shafts of various diameters and/or configurations.

It should further be appreciated that the construction of the clutch assembly 416 (as with the previous embodiments) enables a very simple method of manufacture, which requires nesting of components and then a simple connection between the spring actuator and armature disc. Specifically, referring to the exploded view of FIG. 9, each of the individually illustrated components are manufactured separately and then assembled simply by nesting the resilient torsion damper member 452, torque coupling 450, axially compressible resilient structure 490, hub 432 and spacer 430 generally within/on the spring actuator 454, seating the spacer 430 on shoulder 428, and then inserting and fixing projections 496 in holes 498.

The foregoing detailed description of the preferred embodiments of this invention has been provided for the purposes of illustration and description. It is not intended to be exhaustive or to limit the invention to the precise embodiments disclosed. Other modifications and variations may be evident to practitioners in the art when considered in reference to this disclosure.

What is claimed is:

1. An electromagnetic clutch and pulley assembly for a motor vehicle engine, said engine including a driven component having a shaft rotatable about an axis for driving said component, said electromagnetic clutch and pulley assembly comprising:

a pulley member mounted for rotation about said shaft axis;

an electromagnetic coil assembly associated with said pulley member;

a clutch assembly constructed and arranged to selectively couple the pulley member to said shaft responsive to energizing and de-energizing said electromagnetic coil assembly, said clutch assembly including:

a hub constructed and arranged to be coupled to the shaft;

an armature disk operatively associated with said hub and axially spaced from said pulley member, said armature disk being axially movable into engagement with said pulley member when said electromagnetic coil assembly is energized;

torsion transmitting structure constructed and arranged to transmit torsional loads between said armature disk and said hub; and axially compressible resilient structure made from a rubber-based material and constructed and arranged to bias said armature disk axially away from said pulley member, said axially compressible resilient structure being constructed and arranged to be axially compressed to permit said armature disk to move into engagement with said pulley member and thereby enable said armature disk to be rotatably driven by said pulley member, and hence enable said armature disk to transmit rotation of said pulley member through said torsion transmitting structure to said hub and said shaft to drive said component in response to said electromagnetic coil assembly being energized, said axially compressible resilient structure being in non-torsion transmitting relation with respect to said hub and said armature disk and constituting the sole structure that biases said armature disk axially away from said pulley member, so that the sole structure which biases said armature disk axially away from said pulley member is substantially isolated from torsional transmission between said hub and said armature disk.

2. An electromagnetic clutch and pulley assembly according to claim 1, wherein said torsion transmitting structure includes a resilient torsion damping member constructed and arranged to dampen torsional vibration between and to reduce peak torsional load between said hub and armature disk.

3. An electromagnetic clutch and pulley assembly according to claim 2, wherein said resilient torsion damping member comprises a resilient compression spring comprising a rubber material.

4. An electromagnetic clutch and pulley assembly according to claim 3, wherein said axially compressible resilient structure comprises an annular member.

5. An electromagnetic clutch and pulley assembly according to claim 1, wherein said torsion transmitting structure includes a first rigid structure fixed to said armature disk, and a second rigid structure constructed and arranged to transmit torsional movement between said first rigid structure and said hub.

6. An electromagnetic clutch and pulley assembly according to claim 5, wherein said first rigid structure comprises a spring actuator providing a spring engaging wall, and wherein said axially compressible resilient structure is compressed axially between said spring engaging wall and said hub.

7. An electromagnetic clutch and pulley assembly according to claim 6, wherein said spring actuator further comprises a flange fixed to said armature disk, and an outer wall between said flange and said spring engaging wall, and wherein said outer wall of said spring actuator forms part of said torsion transmitting structure.

8. An electromagnetic clutch and pulley assembly according to claim 6, wherein said axially compressible resilient structure is pre-compressed between said spring engaging wall and said hub prior to said electromagnetic coil assembly being energized.

9. An electromagnetic clutch and pulley assembly according to claim 5, wherein said second rigid structure is made from a material selected from a group consisting of steel, ceramic, plastic, and aluminum.

10. An electromagnetic clutch and pulley assembly according to claim 5, wherein said torsion transmitting structure further comprises a resilient torsion damping member disposed between said first and second rigid structures, said resilient torsion damping member constructed and arranged to dampen torsional vibration between and to reduce peak torsional load between said hub and armature disk.

11. An electromagnetic clutch and pulley assembly according to claim 5, further comprising a torsion damping spacer disposed between said second rigid structure and said armature disk.

12. An electromagnetic clutch and pulley assembly according to claim 11, wherein said spacer is capable of limited rotational movement relative to said armature disk when said armature disk is rotatably driven by said pulley member, and wherein friction between said spacer and said armature disk during said limited relative movement provides friction damping of torsional transmission from said armature disk to said hub.

13. An electromagnetic clutch and pulley assembly according to claim 1, wherein said armature disk accelerates towards said pulley member when said electromagnetic coil assembly is energized, wherein said resilient structure has a variable spring rate such that an initial spring rate applies a predetermined resistance to movement of said armature disk towards said pulley member when said electromagnetic coil assembly is energized, and wherein after said armature disk has moved a predetermined distance towards said pulley member, a subsequent spring rate applies a greater resistance to movement greater than the predetermined resistance to movement of said armature disk towards said pulley, so that an acceleration of said armature disk towards said pulley member decreases after said armature disk has moved said predetermined distance toward said pulley member.

14. An electromagnetic clutch and pulley assembly according to claim 1, wherein said torsion transmitting structure includes a resilient torsion damping member having an irregularly shaped cavity and said hub has a correspondingly shaped flange which nests within said cavity.

15. An electromagnetic clutch and pulley assembly for a motor vehicle engine, said engine including a driven component having a shaft rotatable about an axis for driving said component, said electromagnetic clutch and pulley assembly comprising:

a pulley member mountable for rotation about said shaft axis;

an electromagnetic coil assembly associated with said pulley member;

a clutch assembly constructed and arranged to selectively couple the pulley member to said shaft responsive to energizing and de-energizing said electromagnetic coil assembly, said clutch assembly including:

a hub constructed and arranged to be coupled to the shaft;

an armature disk operatively associated with said hub and axially spaced from said pulley member, said armature disk being axially movable into engagement with said pulley member when said electromagnetic coil assembly is energized, said armature disk having at least one magnetic field divider radially spaced from said axis, said at least one magnetic field divider being constructed and arranged to divide magnetic flux and thereby increase magnetic attraction forces generated by current through said electromagnetic coil assembly;

torsion transmitting structure constructed and arranged to transmit torsional movement between said armature disk and said hub; and an axially compressible resilient structure constructed and arranged to bias said armature disk axially away from said pulley member, wherein said hub, said torsion transmitting structure, and said axially compressible resilient structure are disposed entirely radially inwardly of each of said at least one magnetic field divider.

16. A clutch assembly for use with a pulley assembly for a motor vehicle engine, said engine including a component to be driven, and a shaft rotatable about an axis to drive said component, said pulley assembly comprising a pulley member drivable for rotation about said shaft axis by a flexible belt and an electromagnetic coil assembly disposed adjacent to said pulley member, said clutch assembly constructed and arranged to couple the pulley member to said shaft when said electromagnetic coil assembly is energized and comprising:

a hub having a sleeve portion and a flange portion, said flange portion being fixed to said sleeve portion, said sleeve portion constructed and arranged to be drivingly coupled to said shaft;

an armature disk operatively associated with said hub, said armature disk being axially spaced from said pulley member when said electromagnetic coil assembly is de-energized, said armature disk being axially movable into engagement with said pulley member when said electromagnetic coil assembly is energized;

torsion transmitting structure constructed and arranged to transmit torsional movement of said armature disk to said flange portion of said hub, and hence said sleeve portion of said hub; and axially compressible resilient structure constructed and arranged to bias said armature disk axially away from said pulley member, said axially compressible resilient structure being axially compressed a predetermined amount prior to said electromagnetic coil assembly being engergized, and being constructed and arranged to be further axially compressed beyond said predetermined amount to permit said armature disk to move into engagement with said pulley member and thereby enable said armature disk to be rotatably driven by said pulley member, and hence enable said armature disk to transmit rotation of said pulley member through said torsion transmitting structure to said hub and said shaft to drive said component in response to said electromagnetic coil assembly being energized;

said hub being in contact with, but devoid of any connection to, said torsion transmitting structure and said axially compressible resilient structure.

17. A clutch assembly for use with a pulley assembly for a motor vehicle engine, said engine including a component to be driven, and a shaft rotatable about an axis to drive said component, said pulley assembly comprising a pulley member drivable for rotation about said shaft axis by a flexible belt and an electromagnetic coil assembly disposed adjacent to said pulley member, said clutch assembly constructed and arranged to couple the pulley member to said shaft when said electromagnetic coil assembly is energized, said clutch assembly including:

a hub constructed and arranged to be coupled to the shaft;

an armature disk operatively associated with said hub, said armature disk being axially spaced from said pulley member when said electromagnetic coil assembly is de-energized, said armature disk being axially movable into engagement with said pulley member when said electromagnetic coil assembly is energized;

torsion transmitting structure constructed and arranged to transmit torsional movement of said armature disk to said hub; and axially compressible resilient structure made from a rubber-based material and constructed and arranged to bias said armature disk axially away from said pulley member, said axially compressible resilient structure being constructed and arranged to be axially compressed to permit said armature disk to move into engagement with said pulley member and thereby enable said armature disk to be rotatably driven by said pulley member, and hence enable said armature disk to transmit rotation of said pulley member through said torsion transmitting structure to said hub and said shaft to drive said component in response to said electromagnetic coil assembly being energized, said axially compressible resilient structure being in non-torsion transmitting relation with respect to said hub and said armature disk and constituting the sole structure that biases said armature disk axially away from said pulley member, so that the sole structure which biases said armature disk axially away from said pulley member is substantially isolated from torsional transmission between said hub and said armature disk.

18. A clutch assembly for use with a pulley assembly for a motor vehicle engine, said engine including a component to be driven, and a shaft rotatable about an axis to drive said component, said pulley assembly comprising a pulley member drivable for rotation about said shaft axis by a flexible belt and an electromagnetic coil assembly disposed adjacent to said pulley member, said clutch assembly constructed and arranged to couple the pulley member to said shaft when said electromagnetic coil assembly is energized and comprising:

a hub constructed and arranged to be coupled to the shaft;

an armature disk operatively associated with said hub, said armature disk being axially spaced from said pulley member when said electromagnetic coil assembly is de-energized, said armature disk being axially movable into engagement with said pulley member when said electromagnetic coil assembly is energized, said armature disk having at least one magnetic field divider radially spaced from said axis, said at least one magnetic field divider being constructed and arranged to divide magnetic flux and thereby increase magnetic attraction forces generated by current through said electromagnetic coil assembly;

torsion transmitting structure constructed and arranged to transmit torsional movement of said armature disk to said hub; and an axially compressible resilient structure constructed and arranged to bias said armature disk axially away from said pulley member, said axially compressible resilient structure constructed and arranged to be axially compressed to permit said armature disk to move axially into engagement with said pulley member and thereby enable said armature disk to be rotatably driven by said pulley member, and hence enable said armature disk to transmit rotation of said pulley member through said torsion transmitting structure to said hub and said shaft to drive said component in response to said electromagnetic coil assembly being energized;

wherein said hub, said torsion transmitting structure, and said axially compressible resilient structure are disposed entirely radially inwardly of each of said at least one magnetic field divider.

\* \* \* \* \*